Sept. 7, 1965  W. S. FORTUNE  3,205,434
DYNAMIC IGNITION TESTING SYSTEM HAVING INDIVIDUAL NEON
INDICATORS AND A SELECTIVELY CONNECTED NEON INDICATOR
AND VARIABLE GAP ACROSS THE SPARK PLUGS
Filed Sept. 8, 1961  2 Sheets-Sheet 1
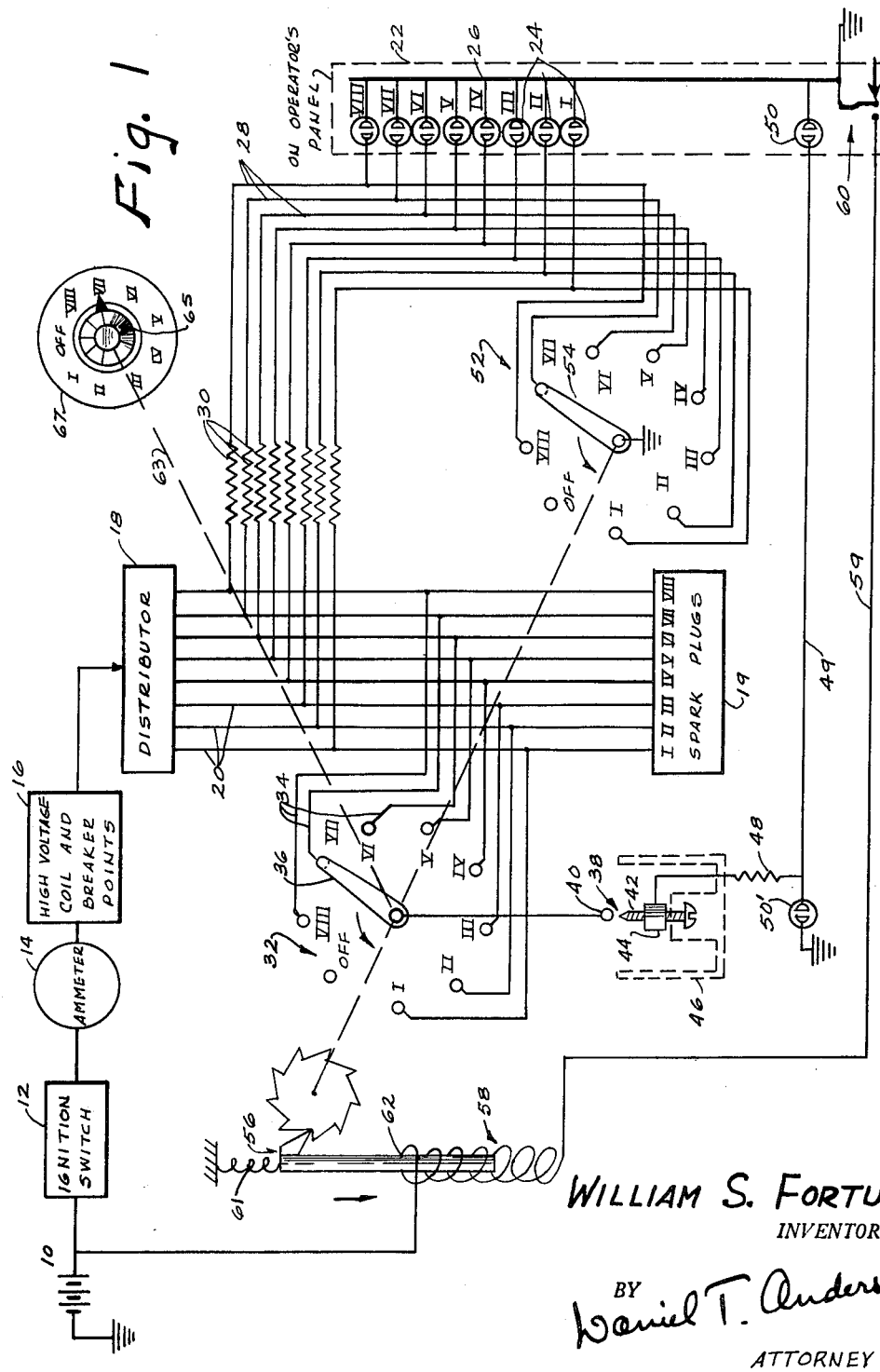
WILLIAM S. FORTUNE
INVENTOR.
BY Daniel T. Anderson
ATTORNEY Sept. 7, 1965 W. S. FORTUNE 3,205,434
DYNAMIC IGNITION TESTING SYSTEM HAVING INDIVIDUAL NEON
INDICATORS AND A SELECTIVELY CONNECTED NEON INDICATOR
AND VARIABLE GAP ACROSS THE SPARK PLUGS
Filed Sept. 8, 1961 2 Sheets-Sheet 2

WILLIAM S. FORTUNE
INVENTOR.

BY Daniel T. Anderson
ATTORNEY

United States Patent Office 3,205,434
Patented Sept. 7, 1965

3,205,434
DYNAMIC IGNITION TESTING SYSTEM HAVING INDIVIDUAL NEON INDICATORS AND A SELECTIVELY CONNECTED NEON INDICATOR AND VARIABLE GAP ACROSS THE SPARK PLUGS
William S. Fortune, 14100 Jouett St., Pacoima, Calif.
Filed Sept. 8, 1961, Ser. No. 136,843
5 Claims. (Cl. 324—18)

This invention relates generally to electrical testing of internal combustion enginess, and more specifically to apparatus for dynamically testing component portions thereof, such as ignition systems and combustion chambers.

It is highly desirable and, particularly in the field of modern high power engines, frequently essential for satisfactory and economic performance that the sub-systems of the engine, such as the ignition system, be in a relatively good state of operating condition. For example, if the ignition system is faulty due to causes, such as intermittent loss of ignition signal, erroded spark plug electrodes, or fouled spark gaps, the efficiency of the engine may be seriously degraded and the engine thereby become undependable, unsafe or at least uneconomical. When one or more of the spark plugs are faulty in operation, as from long use, shorted spark gap, broken electrodes, broken insulator, or disconnected lead, the available power of the engine and its dependability to start, as well as its gasoline consumption rate, may be seriously affected even though the operator may not be aware of the degraded performance or may not know that it is due to a faulty ignition system component. Even when a particularly skilled operator or technician suspects such degraded performance and believes it to be due generally to the ignition system, he has heretofore been unable to be satisfactorily certain that the performance was in fact degraded and whether it was due to the ignition system, and more importantly, which component or components of the system were faulty. For reasons such as these, it has become more or less a standard practice simply to replace spark plugs regularly, for example, every 5,000 miles in high compression automobile engines or every few hundred miles in engine testing automobiles or in competition events as insurance that at least the spark plugs are performing as designed. However, for an eight-cylinder engine in particular, this practice is expensive and inconvenient and requires considerable time and effort. Further, the practice is extremely wasteful because frequently at least the majority of the replaced spark plugs are substantially as effective as the new ones.

Other attempts at solution have been typically directed toward providing either statically testing apparatus or extremely elaborate dynamic equipment which is not portable. The former does not provide reliably accurate results because the spark plug is not tested under realistic operating conditions; and the latter is impractical and not economic in many instances because skilled labor and expensive equipment must be employed and the automobile must be taken to the testing equipment.

Other attempts to provide devices for testing ignition systems under actual load conditions have suffered from compromises in accuracy or versatility, or have generally been impractical because they either required a prohibitively large amount of equipment mounted under the hood; were not readily or safely observable by the operator; required that the dangerously high ignition voltage be present on the operator's panel or dashboard; involved an impractical complex system of variable calibrated gaps; caused extensive radio interference in the airplane, boat or automobile; required the removal of the ignition signal from the system or from an individual spark plug during the test; or were not able to monitor continuously the operation of the system or component but required rather that a deliberate test be made when considered to be needed or otherwise indicated.

It is therefore an object of the present invention to provide a testing system for internal combustion engines which is not subject to these and other disadvantages of the prior art.

It is another object to provide such a system which can safely and continuously indicate the condition and the operation of the engine under load to an operator, such as a pilot or driver, who is somewhat removed from the engine space.

It is another object to provide such a system which does not radiate radio frequency interference noise.

It is another object to provide such a system which does not require the adjustment and calibration of a plurality of testing system sparking gaps.

It is another object to provide such a system which does not require or cause the removal of the ignition signal from a properly operative spark plug during a test.

It is another object to provide such a system which may continuously monitor the ignition signal at all the spark plug terminals simultaneously.

It is another object to provide such a system which may selectively, continuously or momentarily test and indicate the impedance of each spark plug circuit and indicate to the operator which spark plug circuit is being observed.

It is another object to provide such a system which may be utilized to test electrically the compression in each cylinder during its operation.

It is another object to provide such a system which may be utilized to measure the magnitude of the high voltage ignition signal.

It is another object to provide such a system which is exceedingly compact and may be vehicle mounted without requiring appreciable adaptation or alteration of the vehicle.

It is another object to provide such a system which is inexpensive, adaptable to any internal combustion engine, and which may be readily mass produced.

Briefly, in accordance with one example of the present invention, these and other objects are achieved by an ignition system and cylinder compression testing system in which the ignition signal at each one of the spark plugs is continually monitored by one of a set of high impedance neon lamp circuits in which the lamps are mounted in a systematic array on the dashboard of an automobile so that a particular neon lamp is identified as referring to a known particular spark plug circuit. The high energy of the ignition signal is isolated from each of the neon lamps on the operator's panel by a current limiting resistor or capacitor. If the engine is operating properly, and at a moderately high rate of revolutions per minute, all of the lamps will flicker rapidly or appear to glow continuously. If, on the other hand, one of the spark plug leads is removed, or faulty, or shorted to ground, or the high voltage electrode of that spark plug is resistively connected or shorted to ground because of a broken insulator or electrode, the neon lamp associated with that spark plug will be continually or intermittently extinguished depending upon the nature of the fault.

Also connected to each spark plug lead is a rotary switch which selectively couples one of the leads to an adjustable sparking gap which is connected in series with a current limiting resistor and a dashboard-mounted spark plug gap testing neon lamp, so that the series of adjustable gap, resistor, and lamp are connected in parallel between a selected spark plug lead and ground. The adjustable gap is adjusted so that its impedance is somewhat greater than that of a properly gapped spark plug. Thusly, when the spark plug is functioning properly, the neon lamp will not be energized; but when its gap becomes eroded, or the impedance of the spark plug circuit becomes otherwise extraordinarily high, the neon lamp will be energized so to indicate.

A solenoid actuated rotary stepping ratchet drives the rotary switch to connect the series circuit to different ones of the spark plugs. The solenoid is energized by a momentary contact switch mounted on the dashboard, and in one embodiment of the invention, the neon lamp is mounted cooperatively on the momentary contact switch within the array of ignition system monitoring lamps on the cockpit dashboard. Thus, when the holder for the gap testing lamp is depressed, the solenoid is energized to advance the rotary switch to a different spark plug.

A second rotary switch is provided in this example which is coupled to each of the ignition signal monitoring lamps, and which selectively removes the signal from a particular lamp thereby to extinguish it. This second rotary switch is effectively ganged to the first rotary switch in a manner such that the lamp associated with the spark plug being tested is extinguished to indicate and identify the spark plug being tested so that if it should be replaced or repaired the operator will know immediately which spark plug should be so removed. Not only is fuel economy thus maintained at a high level, but it is accomplished by replacing only one spark plug instead of the entire set.

To test the compression of a cylinder, the adjustable gap is connected to the spark plug associated with that cylinder. The length of the adjustable gap is then decreased along a calibrated scale until the spark plug gap testing lamp becomes energized. The reading of the calibrated scale until the spark plug gap testing lamp becomes energized. The reading of the calibrated scale then indicates the compression or pressure within the cylinder at the time of ignition. If the cylinder has poor compression due, for example, to a damaged valve or a broken compression ring, the impedance of the spark plug gap will be lower than usual and the adjustable gap will have to be shorter than usual in order to cause the testing lamp to be illuminated.

In a similar manner, the intensity of the available ignition signal may be quantitatively measured by removing one spark plug from its associated circuit and connecting its high voltage lead to the adjustable gap. The length of the adjustable gap which just permits the testing lamp to be energized may be calibrated as a function of magnitude of ignition voltage so as to give a reading singularly indicative of the voltage value.

Further details of the novel features of the invention and their principles of operation, as well as additional objects and advantages thereof, will become apparent and be best understood from a consideration of the following description taken in connection with the accompanying drawings which are presented by way of example only, and in which:

FIG. 1 is a schematic diagram of one embodiment of an internal combustion engine testing system constructed in accordance with the present invention;

Figure 5:
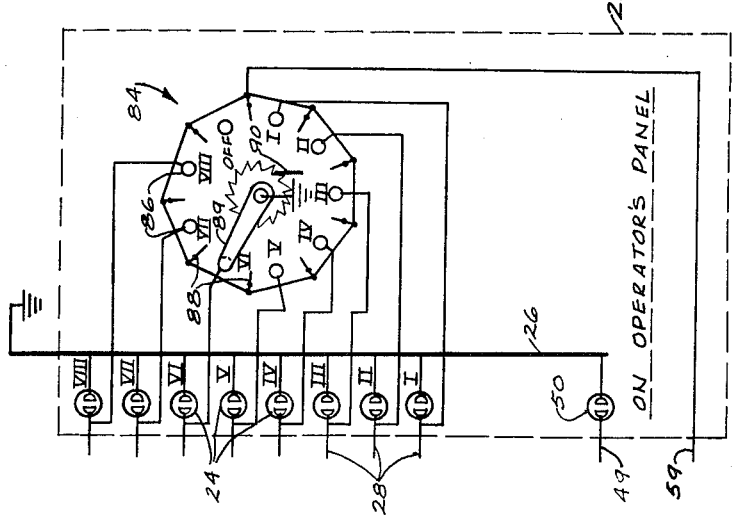
FIG. 5 is a schematic diagram of a portion of an alternative embodiment of the present invention.

Referring in more detail to the particular figures, it is stressed that the details shown are by way of example only and are presented in the cause of providing what is believed to be the most useful and readily understood description of the principles of the present invention. The detailed showing is not to be taken as a limitation upon the scope of the invention which is to be measured by the appended claims which are intended as forming a part of this specification.

In the schematic diagram of FIG. 1, there is shown an example of an electrical tester for observing the high voltage ignition signal at the terminal of each of the spark plugs of an eight cylinder internal combustion engine. The system illustrated may also test the condition of the sparking gap of each of the spark plugs and indicate to the operator which spark plug is being observed. A source of direct current voltage 10, which may in this example be a 12-volt automobile battery, is connected through an ignition switch 12 and an ammeter 14 to the high voltage source 16 of the ignition signal. The source 16 conventionally includes a low voltage primary winding, not shown, the current through which is pulsed by a pair of breaker points in series with the ignition switch and source 10. A high voltage secondary winding, also not shown, is inductably coupled to the low voltage primary winding and its output terminal is connected to a distributor 18. The distributor 18 in a convention manner sequentially distributes or connects the high voltage ignition signal to each of the eight spark plugs designated I through VIII by means of eight high voltage insulated ignition leads. These and all other leads carrying ignition signals in the system are preferably shielded to eliminate radio frequency radiation and cross-talk between contiguously disposed leads. Such shielding also adds a safety factor in preventing and precluding the existence of high or intermediate voltage signals in the cockpit or elsewhere due to an accident or insulation abrasion.

Mounted on the operator's panel 22 within the cockpit of the automobile is a set of eight ignition signal monitoring neon lamps 24 individually designated on the drawing by I through VIII. One terminal of each of the neon lamps 24 is grounded to a common, return bus 26 which may, in this example, be the conductive body of the automobile; and the other terminal is coupled by one of a set of eight leads 28 through a current limiting resistor 30 to a respective one of the ignition leads 20. The magnitude of the current limiting resistors 30 is chosen to be such that with the desired current to produce the desired brilliance of the illumination of the lamps 24 the voltage at the terminal will be of the order of 70 to 80 volts. For this amount of current, depending upon the particular make of the automobile engine and the type of neon lamp chosen, the magnitude of resistance of the resistors 30 is normally within the range of 1 to 15 megohms. Thus, it may be seen that when the high voltage source 16 is activated and energized such that the distributor 18 is rapidly sequentially energizing the spark plugs 19 each of the ignition signal monitoring neon lamps 24 will appear to glow continuously, provided there is electrical continuity between them and the distributor and the leads 20 are not shorted to ground.

Each of the eight ignition leads 20 is also connected to one terminal of a rotary switch 32 through a respective individual one of a set of leads 34. Each of the stationary terminals of the rotary switch 32 is designated by I through VIII to indicate that it is associated with a particular one of the eight spark plugs 19. A ninth terminal on the switch 32 is a blank terminal designating an "off" position. The rotating terminal 36 contacts at all stationary times one and only one of the stationary terminals I through VIII or "off." That is, it is designed in a conventional manner to have no dead centers between the stationary terminals.

The rotating terminal 36 is connected to an adjustable spark gap 38 which includes a stationary electrode 40 and a movable electrode 42. The movable electrode 42 is threaded and is caused to advance toward or away from the stationary contact 40 by rotating it with respect to a stationary support 44. The movable electrode 42 is connected to an assembly housing cap 46 so that rotation of the cap 46 controls the length of the adjustable spark gap 38. Electrically connected to the movable electrode 42 is a current limiting resistor 48 which is connected in turn, by a lead 49, to one terminal of a spark plug gap testing neon lamp 50. The other terminal of the neon lamp 50 is connected to the bus 26. As indicated in the figure, the testing lamp 50 is mounted on the operator's panel 22 in the proximity of the monitoring lamps 24. The current limiting resistor 48 has usually been found in this embodiment to be preferably in the range of zero to 1 megohm in magnitude of resistance. Because this magnitude of resistance would permit the existence of significant high voltage energy on the operator's panel 22 in the event of the removal or failure of the lamp 50, a second neon lamp 50' is connected in parallel with the lamp 50 as a safety precaution as well as for other purposes to be discussed in detail below.

In order that the operator may know positively which spark plug lead is connected to the adjustable spark gap 38 by the rotary switch 32, a second rotary switch 52 which is effectively ganged to the first rotary switch 32 and has each of eight of its stationary terminals connected to a respective one of the monitoring lamps 24. The rotating terminal 54 effectively shorts out whichever one of the monitoring lamps to which it is connected, thus indicating remotely and safely the position of the rotating contact of the rotary switch 32.

The ganged rotary switches 32 and 52 in this example are driven by a nine-step solenoid actuated ratchet drive 56. One terminal of its solenoid 58 is connected to the direct current voltage source 10 and its other terminal is connected through a lead 59, to one terminal of a momentary contact switch 60 which is mounted on the operator's panel 22. The other terminal of the switch 60 is connected to the common bus 26. Hence, each time the switch 60 is actuated, the solenoid 58 is connected across the terminals of the source 10 and is energized to draw its armature 62 within the solenoid and cause the ratchet drive 56 to advance by one step which, in this example, is 40 degrees of rotation. After each such step, the armature is returned by a tension spring 61.

The rotary switch 32 may, alternatively, be rotated by a direct mechanical linkage 63 which is terminated by a rotatable knob and pointer 65 which may be mounted on the operator's panel 22 or, for example, within the engine space. The knob may be mounted in association with a stationary scale 67 which indicates which spark plug circuit is connected to the adjustable gap 38. This arrangement is particularly practical when the engine space and operator's space are very close to each other as in light planes or tractors and where instrument weight and space must be stringently minimized. In this arrangement, the second rotary switch 52 and the solenoid 58 may be deleted from the system, or the solenoid only may be deleted so that the operator mechanically actuates both rotary switches which function electrically in cooperation with the monitoring lamps as discussed above.

Figure 2:
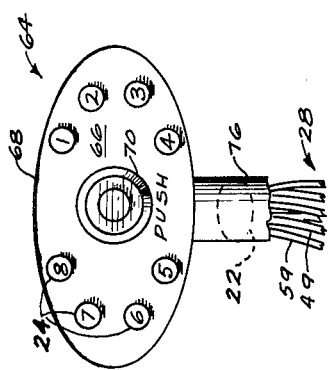
FIG. 2 is a front elevational view of a dash-mounted assembly of a portion of the present invention.
Figure 3:
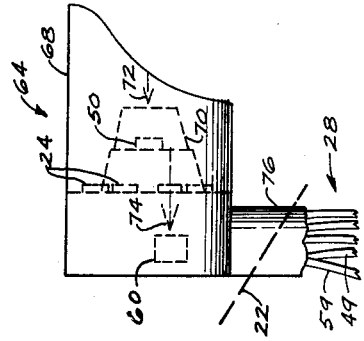
FIG. 3 is a side elevational view of the structure depicted in FIG. 2.

In FIG. 2 and FIG. 3 the structure of the panel-mounted assembly 64 is illustrated. The dashboard or operator's panel 22 is indicated by the dotted lines in each figure. The neon monitoring lights 24 are shown mounted on the face 66 of the assembly 64 and a hood 68 shields the illumination of the neon bulbs 24 from any intense daylight radiation. For night driving, an adjustable optical, dimming, filter, not shown, may be mounted over the face 66 to reduce the brilliance of the bulbs. Mounted in the center of the array of monitoring lamps 24 is the spark plug gap testing lamp 50. The housing for the testing lamp 50 forms, cooperatively, the activating lever for the momentary contact switch 60 such that when the housing 70 is depressed inwardly in the direction of the arrow 72, as by the operator's finger tip, the force is coupled through a simple linkage 74 to cause activation of the switch 60. The leads 28 as well as the lead 49 to the neon testing lamp 50 and the lead 59 to the momentary contact switch 60 are shown communicating through the hollow support 76 of the assembly 64. This bundle of leads communicates between the assembly 64 and the engine system components and testing system components illustrated schematically in FIG. 1.

Figure 4:
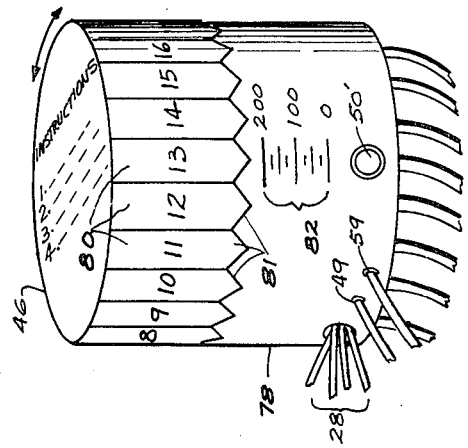
FIG. 4 is a perspective view of another sub-assembly portion of the structure of the present invention.

FIG. 4 illustrates the housing 78 which may encase and support the components of the testing system which are in this example disposed under the hood of the automobile. The rotating cap 46 for the housing 78 is secured to the movable electrode 42 of the adjustable spark gap 38 as indicated in FIG. 1. As the cap 46 is rotated with respect to the housing 78, the movable electrode 42 advances toward or moves away from the stationary electrode 40 of the spark gap 38, and the cap moves up or down, in the figure, accordingly. Disposed around the cylindrical periphery of the housing cap 46 is a set of vernier numbers 80, each of which has an indicator pointer 81 associated respectively therewith. A cooperating longitudinal scale of numbers 82 is disposed along the cylindrical length of the assembly housing 78. The vernier numbers 80 are evenly spaced about the periphery of the cap 46 and the scale of numbers 82 is similarly evenly spaced along the length of the housing 78. Thusly, as in the operaiton of a micrometer, and with micrometer accuracy, the length of the spark gap 38 may be known and adjusted. A "zeroing" or calibration means may be provided when desired by a small amount of rotation of the slotted head of the movable electrode 42 with respect to the housing cap 46; see FIG. 1.

Referring to FIG. 5, a portion of an alternative embodiment of the invention is illustrated in which the function of the second rotary switch 52 and the momentary contact switch 60 are performed by a combination rotary switch 84 mounted on the operator's panel 22. The combination rotary switch 84 has two sets of stationary contacts 86, 88. The set 86 includes nine contact points individually indicated by I through VIII and "off." Each of these points is connected to a respective one of the monitoring neon lights 24. The rotary contact 89 is connected to ground and is manually rotated as by the operator's fingers in a counterclockwise direction as shown in the drawing. Rotation in the opposite sense of direction is precluded by a ratchet 90, the ratchet wheel of which is connected to the rotary contact 89. The rotary switch 84 is of the character such that the rotary contact 89 has stable stopping positions only in contact with the individual ones of the stationary sets of contacts 86. Thus, as the rotary contact 89 is rotated by the operator, it can stop only in contact with individual ones of the stationary contacts which are connected to individual ones of monitoring neon lights 24, thereby to short out a particular one of them.

As the rotary contact 89 is rotated through one of the stationary contacts 86 to a succeeding one, it brushes, in momentary contact, one of the stationary terminals of the set 88 thereby momentarily connecting it to ground. This action performs the same functions as that of the momentary contact switch 60 illustrated schematically in FIG. 1 and discussed in connection therewith; that is, the brushing action causes an energizing of the solenoid 58 and steps the ratchet drive 56 to rotate the movable contact 36 of the rotary switch 32 from one of its stationary contacts to the next. Thus, when the operator rotates the movable contact 89, the movable contact 36 of the first rotary switch 32 follows this action and connects the adjustable spark gap 38 and testing lamp 50 to a particular one of the spark plugs 19, the identity of which is shown to the operator when he observes which of the monitoring neon lamps 24 is extinguished.

In operation, the rotary contact 36 of the first rotary switch 32 is advanced to the "off" position so that if each of the spark plugs 19 is receiving a proper ignition signal, all of the monitoring lights 24 will be illuminated and this condition indicates that the ignition signal is present at each of the spark plugs; that its lead is not parted or removed; that its gap is not shorted or fouled as by carbon or fuel residue deposits; that its lead is not intermittently being shorted; and that the insulator of the spark plug is not broken to cause a short.

When the rotary contact 36 is advanced from the "off" position, a particular one of the monitoring neon lights 24 will be extinguished to indicate which of the spark plugs is coupled to the adjustable spark gap 38 for testing. The spark gap 38 will normally have been adjusted previously to a length such that its effective impedance is somewhat greater than that of a properly gapped spark plug for the particular engine to which the system is attached. Thus, the ignition energy will choose to traverse the path of lesser impedance, namely, that of the spark plug; and the system will function normally. If, however, the particular spark plug and gap represents an increased impedance due to spark plug electrode errosion, or electrode breakage, or the removal of the lead from a spark plug, the ignition energy will choose the route of the lesser impedance, namely, the adjustable spark plug gap 38. The latter path of conduction will cause an illumination of the testing lamp 50 which may be observed by the operator to indicate a faulty spark plug circuit. The actual phenomenon causing the ignition energy to traverse the adjustable gap 38 instead of the spark plug gap may be described as being due to the unregulated nature of the high voltage ignition signal source. When the impedance seen by it is creased by the faulty plug, its magnitude increases causing it to jump the adjustable spark gap 38.

The compression test for the combustion cylinder is based upon the same phenomena. The impedance of the spark plug gap within the combustion cylinder is proportional to the magnitude of pressure or compression within the cylinder at the time of the ignition signal. Thus, if the compression is high, the impedance of the spark plug gap is high; and the unregulated high voltage ignition signal source will provide a relatively high magnitude of ignition voltage which may cause a breakdown and traversal of the adjustable gap 38, even when it is relatively widely spaced. If, on the other hand, the compression in the combustion cylinder is poor due, for example, to a damaged or jammed valve or broken piston ring, or the like, the impedance of the spark plug gap will be low; the magnitude of ignition voltage will be low and the ignition signal may traverse the adjustable spark gap 38 unless it is reduced to a very small width. Thus, the compression of the cylinder may be measured while the engine is operating by rotating the housing cap 46 and, thereby, the movable electrode 42 in a direction to decrease the length of the adjustable gap 38 until the testing lamp 50 is ignited. To this end, the auxiliary testing lamp 50', which additionally constitutes a safety device to preclude the existence of high ignition voltage on the operator's panel, may be mounted in view on the housing 78 as shown in FIG. 3. The reading determined by the vernier numbers 80 and the scale of numbers 82 on the housing 78 required to extinguish or energize the testing lamp 50 or auxiliary lamp 50' may be referred to an emperically derived chart supplied by the manufacturer or may be compared to the readings obtained with the other combustion chambers of the same engine to determine whether one is significantly different from the others thereby indicating that it is malfunctioning.

In like manner, the magnitude of the high voltage output of the coil, source 16, may be quantitatively measured. For this measurement any one of the spark plugs 19 is removed from its high voltage lead 20 which is then, through the rotary switch 32, connected to the adjustable gap 38. The length of the gap which just causes the lamp 50' to be energized may be calibrated as a function of voltage. The reading of the vernier scale on the housing 78 is then a direct measure of the available ignition signal voltage and indicates the condition of the high voltage coil, breaker points and condenser, and distributor.

A further aspect of the operation of the system, and an aspect which relates directly to providing the most efficient operation of the internal combustion engine, is that the relative brilliance of the illumination of the monitoring bulbs 24 is a function of loading conditions under which the engine is operating. When the engine is accelerating under heavy load, for example, and the throttle is relatively open, the cylinder compression and fuel content are higher which raises the impedance of the spark gaps and causes the unregulated voltage supply to have a higher voltage output. This higher voltage is coupled through the resistors 30 to the neon bulbs 24 causing them to glow more brightly than when the engine is cruising and burning fuel at a lower rate. Thus the operator is reminded that the engine is working harder and using more fuel whenever the bulbs 24 are brighter. As set forth above, the current limiting resistors 30 are one example of means for coupling the ignition leads 20 to the neon bulbs 24. It is stressed that capacitive coupling, previously mentioned, is in most respects an equivalent means and in some applications has advantages over the resistor example. For example, capacitors when used provide a significantly greater range of brilliance in the effect just discussed and may be of a very simple and inexpensive form such as a small band of foil wrapped onto the ignition leads 20 or a few turns of each of the leads 28 wrapped around a respective one of the leads 20. In addition the capacitor in some cases is safer with respect to becoming shorted and may, depending on its form, radiate less radio frequency noise than the resistive coupling.

Still a further aspect of the invention comprises an insulation test for the various high voltage leads of the system and for leads 20 in particular. An uninsulated portion of lead 49, or an extension thereof, is placed contiguously to a high voltage lead to be tested. The portion is then moved over the length of the high voltage lead, and if any part of it contains faulty or leaking insulation, the bulbs 50 and 50' will be energized to indicate which part of which lead is faulty.

What is claimed is:

1. A dynamic testing system for an internal combustion engine of the character having a predetermined plurality of combustion chambers each having an ignition spark plug disposed therewithin, said testing system comprising: a plurality, equal to said predetermined plurality, of ignition signal monitoring neon lamps disposed in an array on an operator's panel, a like plurality of first current limiting means shieldedly intercoupled between each of said spark plugs and a respective one of said lamps, a calibrated adjustable external sparking gap, a neon spark plug gap testing lamp disposed on said panel, a second current limiting means, said sparking gap, testing lamp, and second current limiting means being shieldedly coupled in a series circuit, first switch means for selectively shieldedly coupling said series circuit in parallel with a predetermined one of said spark plugs, motive means actuable from said panel for advancing said switch means sequentially to couple electrically to different ones of said spark plugs, second switch means for selectively extinguishing a predetermined one of said monitoring lamps, mechanical connecting means connected between said first and second switching means to cause each switch to be connected simultaneously to the same spark plug whereby the extinguishing of the particular one of said monitoring lamps indicates that said series circuit is coupled to a respective particular one of said spark plugs, said spark plugs and said monitoring lamps each having a common terminal which is coupled to a return bus.

2. A dynamic testing system for an internal combustion engine of the character having a predetermined plurality of combustion chambers each having an ignition spark plug disposed therewithin, said testing system comprising: a plurality, equal to said predetermined plurality, of ignition signal monitoring neon lamps disposed in an array on an operator's panel, a like plurality of first current limiting means intercoupled between each of said spark plugs and a respective one of said lamps, a calibrated adjustable external sparking gap, a neon spark plug gap testing lamp disposed on said panel, a second current limiting means, said sparking gap, testing lamp, and second current limiting means being coupled in a series circuit, first switch means for selectively coupling said series circuit in parallel with a predetermined one of said spark plugs, motive means controllable from said panel for advancing said switch means to couple it sequentially to selected different ones of said spark plugs, second switch means for selectively extinguishing a predetermined one of said monitoring lamps, switch position correlation means intercoupled between said first and second switching means to cause each switch to be connected simultaneously to the same spark plug whereby the extinguishing of the particular one of said monitoring lamps indicates that said series circuit is coupled to a respective particular one of said spark plugs, said spark plugs and said monitoring lamps each having a common terminal which is coupled to a return bus.

3. A dynamic testing system for an internal combustion engine of the character having an associated operator's panel and a plurality of $n$ combustion chambers each having an ignition spark plug with a sparking gap disposed therewithin, said testing system comprising: $n$ ignition signal monitoring gaseous discharge lamps disposed on said panel, $n$ current limiting means each intercoupled between a respective pair including one of said lamps and one of said spark plugs, a spark plug gap testing gaseous discharge lamp disposed on said panel, an adjustable sparking gap, a second current limiting means intercoupled between said adjustable sparking gap and said testing lamp to form a series circuit, first switch means for selectively coupling said series circuit in parallel with a predetermined one of said spark plugs whereby the ignition signal may traverse predominantly the spark gap of said predetermined one of said spark plugs only when it is effectively a lower impedance than said series circuit, second switch means for selectively de-energizing a predetermined one of said monitoring lamps, correlation means for mechanically intercoupling said first and second switch means such that the de-energizing of a particular one of said monitoring lamps during a particular time period indicates to an observer that a corresponding particular spark plug is coupled to said series circuit during said time period thereby to identify the spark plug being tested, said spark plugs and said monitoring lamps each having a common terminal which is coupled to a return bus.

4. A dynamic testing system for an internal combustion engine of the character having an associated operator's panel and a plurality of $n$ combustion chambers each having an ignition spark plug with a sparking gap disposed therewithin, said testing system comprising: $n$ ignition signal monitoring neon lamps disposed on said panel, $n$ current limiting means each intercoupled between a respective pair including one of said lamps and one of said spark plugs, a spark plug gap testing neon lamp disposed on said panel, a calibrated adjustable sparking gap, a second current limiting means intercoupled between said adjustable sparking gap and said testing lamp to form a series circuit, first switch means for selectively coupling said series circuit in parallel with a predetermined one of said spark plugs whereby the ignition signal may traverse predominantly the spark gap of said predetermined one of said spark plugs only when it is effectively a lower impedance than said series, second switch means for selectively de-energizing a predetermined one of said monitoring lamps, mechanical correlation means for ganging together said first and second switch means such that the de-energizing of a particular one of said monitoring lamps during a particular time period indicates to an observer that a corresponding particular spark plug is coupled to said series circuit during said time period thereby to identify the spark plug being tested, and actuating means mechanically connected to said correlation means for advancing said first switch means sequentially to couple it to different selected ones of said spark plugs, said spark plugs and said monitoring lamps each having a common terminal which is coupled to a return bus.

5. A dynamic testing system for an internal combustion engine of the character having an associated operator's panel and a plurality of $n$ combustion chambers each having an ignition spark with a sparking gap disposed therewithin, said testing system comprising: $n$ ignition signal monitoring neon lamps disposed on said panel, $n$ current limiting means each intercoupled between a respective pair including one of said lamps and one of said spark plugs, a spark plug gap testing neon lamp disposed on said panel, a calibrated adjustable sparking gap, a second current limiting means intercoupled between said adjustable sparking gap and said testing lamp to form a series circuit, first switch means for selectively coupling said series circuit in parallel with a predetermined one of said spark plugs whereby the ignition signal may traverse predominantly the spark gap of said predetermined one of said spark plugs only when it is effectively a lower impedance than said series circuit, second switch means for selectively de-energizing a predetermined one of said monitoring lamps, mechanical correlation means for intercoupling said first and second switch means such that the de-energizing of a particular one of said monitoring lamps during a particular time period indicates to an observer that a corresponding particular spark plug is coupled to said series circuit during said time period thereby to identify the spark plug being tested, electromechanical motive means for advancing said first and second switch means, and actuating means disposed on said operator's panel and coupled to said motive means for electrically controlling said motive means, said spark plugs and said monitoring lamps each having a common terminal which is coupled to a return bus.

References Cited by the Examiner
UNITED STATES PATENTS

| 1,370,638 | 3/21 | Euler et al. | 324—17 X |
| 1,592,533 | 7/26 | Metzger | 324—18 |
| 1,915,709 | 6/33 | Wiseman | 324—18 |
| 2,005,992 | 6/35 | Heaton | 324—18 |

WALTER L. CARLSON, *Primary Examiner.*